(12) United States Patent
Baumgartner et al.

(10) Patent No.: US 7,693,504 B2
(45) Date of Patent: Apr. 6, 2010

(54) METHOD FOR REDUCTION OF THE POWER CONSUMPTION OF A MOBILE DATA MEMORY; APPLICATION OF THE METHOD TO AN IDENTIFICATION SYSTEM WITH AT LEAST ONE READ/WRITE DEVICE AND A MOBILE DATA MEMORY

(75) Inventors: Josef Baumgartner, Vienna (AT); Janos Gila, Mödling (AT)

(73) Assignee: Siemens Aktiengesellschaft, Munich (DE)

( * ) Notice: Subject to any disclaimer, the term of this patent is extended or adjusted under 35 U.S.C. 154(b) by 48 days.

(21) Appl. No.: 10/566,011

(22) PCT Filed: Jul. 28, 2004

(86) PCT No.: PCT/EP2004/008455

§ 371 (c)(1),
(2), (4) Date: Jan. 25, 2006

(87) PCT Pub. No.: WO2005/013190

PCT Pub. Date: Feb. 10, 2005

(65) Prior Publication Data

US 2007/0111671 A1  May 17, 2007

(51) Int. Cl.
*H04B 1/16* (2006.01)
(52) U.S. Cl. ............... 455/343.2; 235/380; 235/492
(58) Field of Classification Search ........... 455/343.2, 455/343.5, 574, 127.5
See application file for complete search history.

(56) References Cited

U.S. PATENT DOCUMENTS 5,212,373 A * 5/1993 Fujioka et al. ............ 235/492
6,760,578 B2 * 7/2004 Rotzoll .................. 455/343.2
6,845,454 B2 * 1/2005 Kim ........................ 713/300
6,970,726 B2 * 11/2005 Takayanagi ............... 455/574
2003/0178483 A1 * 9/2003 Wakabayashi ............ 235/380

FOREIGN PATENT DOCUMENTS

WO    WO 01/45280 A1    6/2001

OTHER PUBLICATIONS

ISO 18000 RFID standard 4 part 4 updated Jan. 31, 2002 by Steve Halliday.*
ISO 180004 part4,updated Jan. 31, 2002 by Steve Halliday.*
RFID standard by Steve Halliday,pub.Jan. 31, 2002.*

* cited by examiner

*Primary Examiner*—Duc Nguyen
*Assistant Examiner*—Ajibola Akinyemi

(57) ABSTRACT

The invention relates to a method for reduction of the power consumption of a mobile data memory with a non-contact data transmission by means of a read/write device. According to the invention, the mobile data memory, containing at least one energy store and user, is supplied, at least during a cyclic inactive idle mode, with a first clock frequency from a first oscillator and, for data receipt at least during a cyclic request time, with a second higher clock frequency from a second oscillator. The second clock frequency is determined above all for data modulation of a received signal, obtained from the reception antenna or from a combined transmission/reception antenna on the mobile data memory. The invention further relates to a mobile data memory and an identification system with at least one read/write device and one mobile data memory. The advantage of requiring no battery exchange during the life of the mobile data memory is thus conferred.

8 Claims, 1 Drawing Sheet

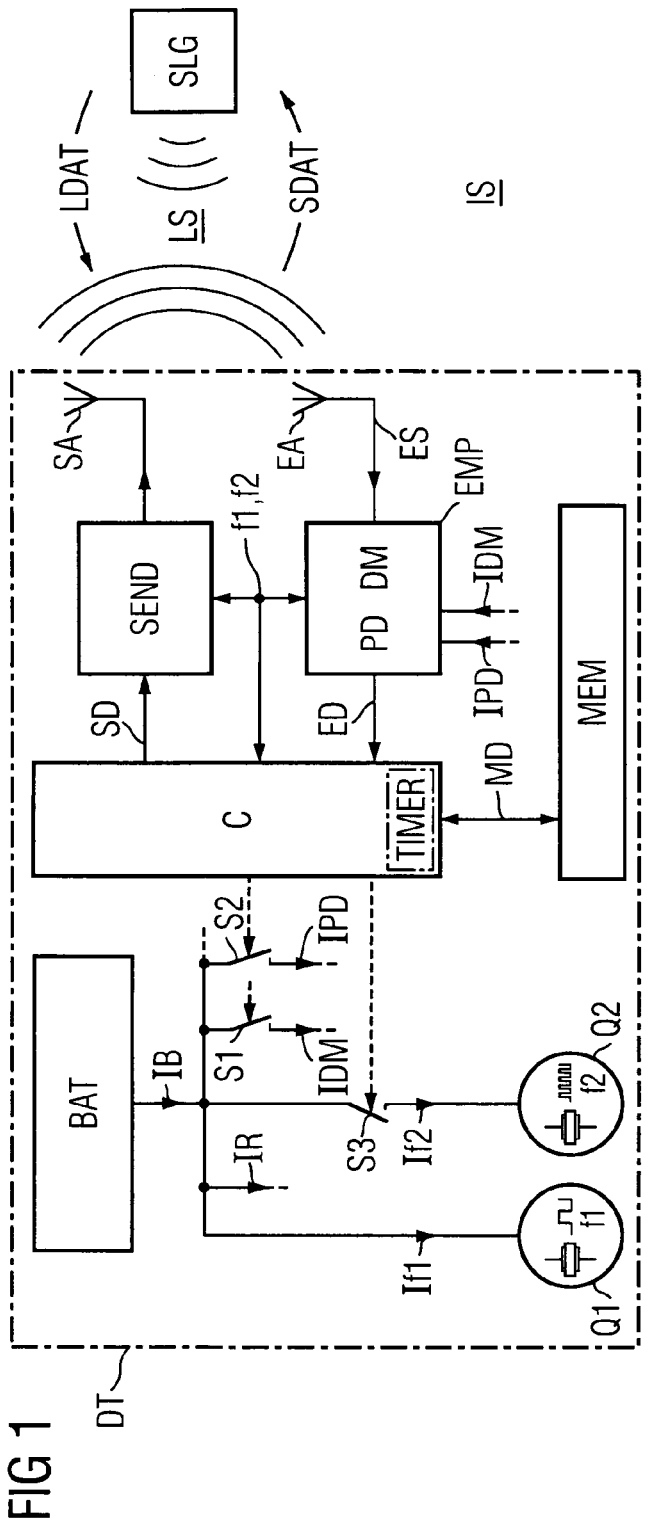
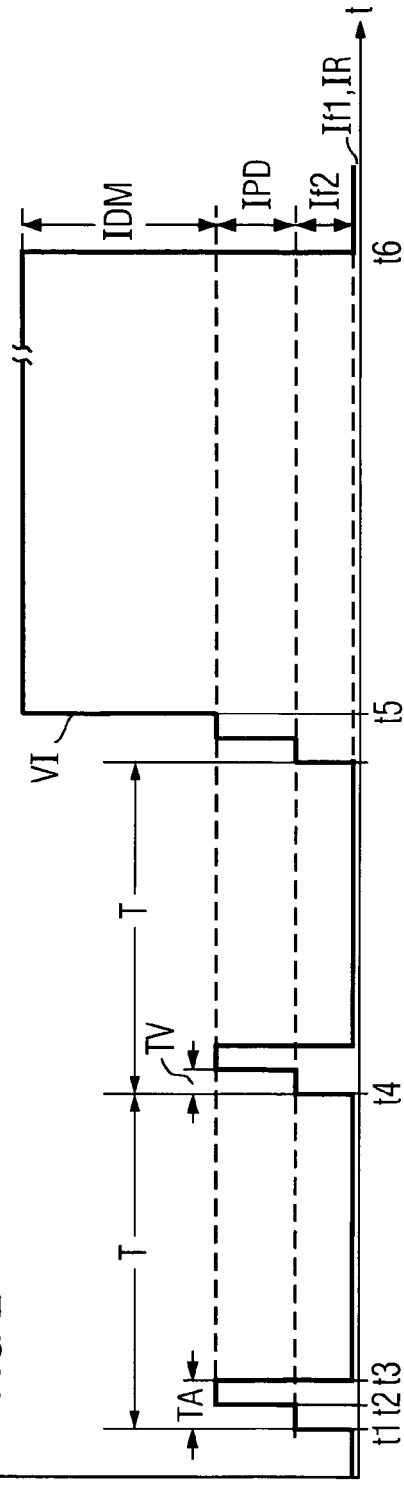
FIG 1
FIG 2

METHOD FOR REDUCTION OF THE POWER CONSUMPTION OF A MOBILE DATA MEMORY; APPLICATION OF THE METHOD TO AN IDENTIFICATION SYSTEM WITH AT LEAST ONE READ/WRITE DEVICE AND A MOBILE DATA MEMORY

CROSS REFERENCE TO RELATED APPLICATION

This application is the US National Stage of International Application No. PCT/EP2004/008455, filed Jul. 28, 2004 and claims the benefit thereof. The International Application claims the benefits of German Patent application No. 10334398.9 DE filed Jul. 28, 2003, both of the applications are incorporated by reference herein in their entirety.

FIELD OF THE INVENTION

The invention relates to a method for reducing the power consumption of a mobile data memory for contactless data transmission with a read/write device. The invention further relates to a mobile data memory and an identification system including at least one read/write device and a mobile data memory.

BACKGROUND OF THE INVENTION

In the prior art, identification systems are known which include one or more stationary read/write devices which exchange data in a contactless manner with mobile data memories via a data transmission link which usually is radio-based. Systems of this type are used in technical installations in which a large number of objects or commodities must be moved as quickly and freely as possible. The objects may be of various types, e.g. packages in a dispatch installation, assembly parts in a manufacturing plant, items of baggage in a transportation system, etc.

An example of an identification system of this kind is described in the ISO-18000-4-MOD3 standard entitled "Radio-Frequency Identification Standard for Item Management—Air Interface".

The standard provides that polling for the presence of a mobile data memory in the detection range is carried out by the read/write device. For this purpose the read/write device emits an unmodulated carrier signal with a predefinable backscatter frequency of, for example, 2.45 GHz. The signal can be returned to the read/write device passively, e.g. by backscattering, by a mobile data memory located within the reception range.

Independently thereof, the mobile data memory modulates the impedance of an integrated transmit/receive antenna in cyclical sequences with a significant recognition sequence to identify the mobile data memory to a read/write device. In addition, the read/write device receives time information as to when the mobile data memory will switch on its data receiver. If the read/write device can receive the returned modulated backscatter frequency, the validity of the reply is checked. If it is found to be valid, the read/write device applies a data modulated carrier signal at the time when the mobile data memory is expected to be ready for receiving. This signal contains, firstly, the unmodulated backscatter frequency and, secondly, a data modulated communication frequency which signals to the mobile data memory that a data transmission will now follow. The transmitted data may contain, for example, an identification number of the read/write device. By means of this identification number it can be determined, for example, whether the data awaiting transmission is intended for the mobile data memory or not. For the mobile data memory this means that valid or invalid data is to be sent. The mobile data memory can also classify as invalid data already transmitted during a data reception, if inconsistencies, e.g. through transmission errors, are recognized.

A signal received by the receive antenna of the mobile data memory is now polled cyclically and at short intervals for a presence of the data modulated carrier signal, i.e. for a simultaneous presence of the backscatter frequency and the data modulated communication frequency. If both frequencies are detected, the data receiver of the mobile data memory remains switched on to receive data.

For its power supply the mobile data memory usually has an energy store, in particular a battery. To achieve the longest possible operating life, therefore, it is necessary to minimize the power consumption. A known measure for reducing power consumption is, for example, to select especially power-saving electronic components. In addition, the circuit design of a mobile data memory should take account of the fact that many times more current is required to receive data than to transmit data. Unlike the very low power requirement for the passive backscattering described in the introduction, for which the antenna impedance is modulated only momentarily, several circuits must be connected for data reception. In addition, these circuits, such as data demodulator, amplifier, mixer, etc., require a minimum time until transients have subsided and the components are ready for operation. Moreover, account should be taken of the fact that in operational use data is generally transmitted between read/write device and mobile data memory only for fractions of the total operating time. It is therefore recommended in the above-mentioned standard that the data receiver of the mobile data memory be switched on only cyclically and for a short period to reduce power consumption.

To achieve data reception at a data rate of 384 Kbit/s according to the above-mentioned standard, at least double the reception clock frequency of 384 kHz is required to be able to sample a received signal before demodulation. Frequently, however, oversampling of the incoming signal is essential in order to achieve a more reliable reading of the data. In that case a possible clock frequency would be, for example, four or eight times the above-mentioned required data rate. This would correspond to a clock frequency of 1536 MHz or 3072 MHz respectively. From this clock frequency the data rate of 76.8 Kbit/s laid down for cyclical transmission operation by the standard can be derived by means of dividers connected to the output. But even with the exemplary clock frequency of 1538 MHz, which still yields satisfactory values for data reception, the mean power consumption of the associated quartz oscillator is approximately 20 to 30 µA.

Despite all the aforementioned measures it has not been possible up to now to minimize power consumption to the extent that a battery exchange during the life of the mobile data memory can be dispensed with. This has the associated disadvantage that with an exhausted battery the data stored in the mobile data memory can be lost.

A further disadvantage is that to exchange the battery in time, the mobile data memory must, for example, be withdrawn from the production process. This can cause delays and interference in the process flow. Depending on the case and the field of application, the required life of a mobile data memory can be approximately 10 to 15 years.

SUMMARY OF THE INVENTION

It is the object of the invention to provide a method and a mobile data memory by which the service life of the mobile data memory can be increased.

This object is achieved according to the invention with a method for reducing the power consumption of a mobile data memory for contactless data transmission with a read/write device having the features of the claims.

According to the method, the mobile data memory, which contains at least one energy store and consumers, is supplied with a first clock frequency from a first oscillator at least for a cyclic inactive idle mode, and with a second, higher clock frequency from a second oscillator for data reception at least during a cyclic polling time. The higher clock frequency is intended primarily for data modulation of a received signal obtained from the receive antenna or from a combined transmit/receive antenna of the mobile data memory.

The lower clock frequency, by contrast, serves primarily for internal timing, for example, to supply a "sleep timer", and to transmit data.

This has the advantage that the second clock frequency of the second oscillator, which has higher power consumption, is switched on only during a brief polling time in which it is checked whether a read/write device is located in the environment of the mobile data memory.

The mean power consumption of the mobile data memory can thereby be considerably reduced.

In a further embodiment of the method the second clock frequency is a multiple. As a result, the clock dependent circuit parts can be synchronized with one another for internal timing when transmitting and receiving data.

In an advantageous embodiment of the method the second clock frequency is at least 5 times and preferably 40 times the first clock frequency.

The advantage of a second clock frequency which is very high in comparison to the first clock frequency is that the transient period of the associated oscillator is only a fraction of that of the oscillator for the first clock frequency.

In a preferred embodiment of the method, a level of the received signal is measured within the cyclic polling time and the received signal is then data demodulated if a minimum level is present. With this arrangement the second oscillator can advantageously be switched off again if a minimum level is not present. Polling for the presence of a communication-ready read/write device by means of level detection requires only a fraction of the supply current which is needed, in comparison, for a complete data demodulation.

This advantageously makes possible a further considerable reduction in the mean power consumption of the mobile data memory and therefore an increase in the total service life of the mobile data memory.

As a result, the battery advantageously no longer needs to be exchanged during the whole service life of the mobile data memory. The logistic effort to search for and remove the mobile data memory from, for example, a manufacturing or automation process is therefore advantageously no longer necessary. Possible interference with process flows can thereby be advantageously avoided.

A further advantage is that stored data cannot be lost through an exhausted battery, for example, as a result of failure to exchange the battery in time.

In a further embodiment the data demodulation of the received signal is ended if the demodulated read data is invalid. If that is the case the second clock frequency can be switched off again.

In a preferred embodiment of the method the second clock frequency is switched on for an initial transient period at the start of the polling time and before the data demodulation of the received signal. The transient or switch-on period of the data demodulator and of the other circuit parts of the data receiver is negligible in comparison to the transient period of the oscillator. As a result, these circuit parts with high energy consumption can advantageously be switched on only at the end of the transient period of the oscillator.

The method can advantageously be employed in an identification system based on the ISO/IEC 18000 standard for operation in an ISM frequency band, in particular an ISM frequency band of 2.45 GHz. In particular, the data reception of a mobile data memory takes place in an S1 timeslot according to the standard.

The object of the invention is further achieved according to the invention with a mobile data memory for transmitting data to a read/write device having the features of the claims.

To transmit data to a read/write device the mobile data memory has at least one antenna, a data receiver and data transmitter connected thereto, an energy store for power supply, a first oscillator with a first clock frequency, in particular for a timer and for the data transmitter of the data memory, and a second oscillator with a second, higher clock frequency, in particular for the data receiver. In addition, the data memory has a control unit, e.g. a microcontroller or the like, which intermittently connects circuit parts of the data memory to the energy store and which connects the second oscillator to the energy store at least during a cyclic polling time.

In one embodiment the data receiver includes a data demodulator for data demodulation of a received signal from the antenna. The data modulator is connectable from the control unit to the energy store.

In a further embodiment the data receiver includes a level detector for measuring the level of the received signal. The level detector is connectable from the control unit to the energy store.

For the time-controlled switching on and off of the above-mentioned electronic circuit parts of the mobile data memory, such as the data transmitter, level detector, amplifier and mixer of the data demodulator, the data memory has a clock or timer together with electronic switching means which can be activated, in particular by the control unit. The clock may be in the form, for example, of internal registers in the microcontroller. In addition, the electronic switching means, e.g. transistors may, for example, be integrated in the microcontroller as outputs of an output port.

In a preferred embodiment the oscillators are quartz oscillators, which can advantageously supply an extremely stable clock frequency as integrated electronic components.

A plurality of the aforementioned mobile data memories, together with one or more associated read/write devices, form a mutually attuned identification system.

BRIEF DESCRIPTION OF THE DRAWINGS

This is explained more detail with reference to the following figures, in which:

FIG. 1 shows an exemplary structure of a mobile data memory with two oscillators according to the invention, and FIG. 2 shows an exemplary power consumption curve of the inventive variant of the mobile data memory of FIG. 1.

DETAILED DESCRIPTION OF THE INVENTION

FIG. 1 shows an exemplary structure of a mobile data memory DT which can exchange data with a read/write device SLG via an air interface LS. Write data sent by the mobile data memory DT is denoted by SDAT, and read data SLG from the read/write device SLG is denoted by RDAT. The read/write device SLG forms an identification system IS with at least one mobile data memory DT.

For data transmission with the read/write device SLG the mobile data memory DT includes transmit and receive antennas SA, EA. In the example of the Figure respective antennas SA, EA configured for this purpose are used for transmitting and receiving the data LDAT, SDAT. Correspondingly, a data transmitter SEND and a data receiver EMP are connected respectively to the antennas SA, EA. In addition, the mobile data memory DT includes a control unit C as an electronic data processing unit which transmits the data SDAT to be sent in digital form via an exemplary transmission data line SD, e.g. a data bus, to the data transmitter SEND. The data transmitter SEND may be configured for active or passive operation. The passively operating embodiment based on the backscattering method mentioned in the introduction advantageously has especially low power consumption. In the opposite direction, the control unit C receives the read data LDAT in a corresponding manner from the data receiver EMP. A received signal ES coming from the receive antenna EA is demodulated and prepared in digital form. For this purpose the data receiver EMP has a data demodulator DM, e.g. for intermediate frequency demodulation of the received signal ES, and a level detector PD. The received signal ES may optionally be pre-amplified. Via an exemplary bidirectional memory data line MD, the control unit C stores or unloads the optionally prepared read data LDAT, or the optionally to be prepared write data SDAT, respectively in or from an electronic memory MEM. This may be, for example, a static memory SRAM, an EEPROM or a FRAM memory.

For its energy supply the mobile data memory DT includes an energy store BAT, e.g. a lithium battery. A part of the electronic circuitry, e.g. a volatile electronic memory MEM or timer modules, is connected permanently to the energy store BAT, for example, to maintain the content of the electronic memory MEM. Electronic circuits with high power consumption, e.g. the data demodulator DM, amplifier, HF mixer, etc., may be connected to the energy store BAT by means of electronically activatable switching means S1-S2, e.g. switching transistors. In that case, to reduce power consumption all the circuits necessary for data reception are switched on cyclically to poll for the presence of a read/write device SLG. The switching means S1-S2 may be already integrated in the exemplary control unit C. It is also possible to use, for example, output channels of the control unit C directly to supply electronic circuits with energy.

In the example of the present Figure the associated currents IB,IR,IDM,IPD,If1 are marked. IB is the total supply current which is provided by the energy store BAT. IR denotes the idle current which results from the sum of the idle currents of all the electronic components of the mobile data memory DT. This idle current IR is usually a few µA. IDM denotes the supply current of the data demodulator DM, while IPD denotes the supply current of the level detector PD. The current consumption IP of the level detector PD, however, is greater than the idle current by a factor of approximately 100. If all the components of the data receiver EMP are additionally switched on for a data reception, in particular the data demodulator DM, the total power consumption can be increased by a further factor of 10 to 20.

According to the invention, the mobile data memory DT now has two quartz oscillators Q1,Q2 with a first and a second clock frequency f1,f2, instead of one oscillator as a basis for the transmission and reception timing.

If1 denotes the supply current If1 of the first oscillator Q1, which provides a first clock frequency f1 for the mobile data memory DT. The first clock frequency f1 is intended primarily for a sleep timer, which switches the mobile data memory DT cyclically to the active transmission and/or reception mode. At the same time, the transmission clock pulse for transmission of the data SDAT is derived directly from this first clock frequency f1. Consequently, the first oscillator Q1 is connected permanently to the battery BAT and therefore generates the first clock frequency f1 continuously. From the latter frequency further, lower clock frequencies for internal timing of the integrated electronic circuits may be derived, for example, by means of divider or counter modules not further described. The first clock frequency f1 is, for example, only 153.6 kHz, to provide which the first oscillator Q1 advantageously requires a power consumption of only approximately 2 to 3 µA. Here, the principle applies broadly that the generated clock frequency and the power consumption of an oscillator are approximately proportional to one another. Furthermore, the above-mentioned idle current IR and this supply current If1 form a mean total current IR,If1 of the mobile data memory DT, which is established in the inactive idle mode. In total, this current IR,If1 amounts to a few µA.

The second oscillator Q2 now generates the second clock frequency f2 which, in comparison to the first clock frequency f1, is a multiple thereof. In the example shown in the Figures, 40 times the first clock frequency f1, i.e. a clock frequency of 6144 MHz, is used. The current If2 needed for its generation by the second oscillator Q2 is approximately 100 µA. However, because, according to the invention, the second oscillator Q2 is switched on cyclically, and then only for very short periods, for data demodulation of the received signal ES, and taking account of the fact that in operational use a data transmission between read/write device and mobile data memory generally takes place in fractions of the total operating time, a considerably smaller portion of the current is advantageously established as the mean current consumption for clock pulse generation, in comparison to the solution according to the prior art.

The advantage of the second clock frequency f2, which is very high in comparison to the data reception rate, is that multiple oversampling is possible—16 times in the example shown in the Figure—so that very high reception quality is achieved. In addition, it is an advantage that the quartz oscillator Q2 reaches its steady state without transients considerably more quickly after the supply voltage has been switched on than an oscillator with a comparatively low clock frequency.

FIG. 2 shows an exemplary power consumption curve VI of the variant of the mobile data memory DT according to the invention shown in FIG. 1, the current value IB of which is plotted on a time axis t. Particular time points on the time axis t are denoted by t1 and t6. Because of the quantitatively very different values for the idle current IR, the supply currents If1,If2 of the two oscillators Q1,Q2, of the level detector current IPD and the current IDM of the data demodulator DM in the data receiver EMP, only a qualitative representation is possible. If1 and IR are entered as a common value. Both currents If1,IR are quantitatively approximately equal and are negligible in relation to the other, much larger currents. For these current values of the power consumption curve VI, the mobile data memory DT is in the inactive idle mode. To poll for the presence of a read/write device SLG the system is switched to the ready mode for data reception for only a short cyclic polling time TA, triggered by the sleep timer TIMER. T denotes the cycle time which is established for the usually unsuccessful polling for the presence of a read/write device SLG. The relation between cycle time T and polling time TA should be seen only as an example and—depending on the configuration of the mobile data memory DT—may be a multiple thereof, i.e. 10 to 100 times.

According to the invention, the second oscillator Q2 is switched on during a polling time TA. This can be seen in a sudden increase in the total current requirement IB of the mobile data memory DT at the time points t1 and t5. In addition, the second oscillator Q2 is switched on with an advance time TV—calculated from the start of the polling time TA—before, according to the invention, a level detector PD is switched on once transients in the second oscillator Q2 have subsided. The level detector PD then checks for a brief period t2-t3 whether the characteristic frequencies emitted by a communication-ready read/write device SLG according to the above-mentioned standard are present, and whether a minimum level of an intermediate frequency formed from these two frequencies by means of intermediate frequency demodulation is present. If this is the case, the data demodulator DM with the high-consumption components such as mixer, HF pre-amplifier, etc., having a power requirement of a few mA, is switched on for complete data demodulation. When a valid data transmission has been completed, or invalid data has been recognized, the mobile data memory DT reverts to the inactive idle mode at the time point t6.

The invention claimed is:

1. A method for reducing the power consumption of a mobile data memory for contactless data transmission with a read/write device, comprising:
    providing at least one depletable energy store and energy consuming components for the mobile data memory;
    generating a first clocking signal in a first oscillator, the first clocking signal having a first clock frequency;
    controlling the first oscillator to continuously generate the first clocking signal;
    supplying the mobile data memory with electrical energy from the energy store during a cycle inactive idle mode, wherein power consumption during the idle mode comprise a first power consumption magnitude;
    cyclically generating a second clocking signal in a second oscillator, the second clocking signal having a second clock frequency higher than the first clock frequency;
    monitoring a signal level corresponding to frequencies emitted by the read/write device;
    comparing the signal level relative to a detection threshold;
    when the monitored signal level exceeds the detection threshold, controlling the second oscillator to generate the second clocking signal during a cyclic polling time of a polling cycle;
    if the monitored signal level reverts to a level below the detection threshold, switching off the second oscillator;
    supplying the second clocking signal to a data receiver for data reception at a data reception rate during the cyclic polling time;
    supplying the second clocking signal to a data demodulator during the cyclic polling time, wherein the second clock frequency is sufficiently high relative to the data reception rate to oversample the data being received by the data receiver and, upon a recognition of valid data, performing data demodulation by the demodulator of the received data, wherein the second oscillator is switched on in advance by a predefined time interval relative to the start of the cyclic polling time and prior to performing the demodulation of the received data, wherein power consumption during the cyclic polling time comprise a second power consumption magnitude higher than the first power consumption magnitude, wherein the duration of the cyclic polling time is selected to reduce power consumption and increase an operating life of said at least one depletable energy store; and
    upon completion of the data demodulation, or a recognition of invalid data, reverting the mobile data memory to the cycle inactive idle mode.

2. The method according to claim 1, wherein the second clock frequency is a multiple of the first clock frequency.

3. The method according to claim 2, wherein the second clock frequency is 40 times the first clock frequency.

4. The method according to claim 1, wherein the first clock frequency is used for transmission of the data.

5. The method according to claim 1, wherein the method is used in an identification system based on the ISO/IEC 18000 standard for operation in an ISM frequency band.

6. The method according to claim 5, wherein the identification system is operated in an ISM frequency band of 2.45 GHz.

7. A mobile data memory for transmitting data to a read/write device, comprising:
    an antenna;
    a data receiver and a data transmitter connected to the antenna;
    a depletable energy store for supplying direct current (DC) electrical energy;
    a first oscillator configured to continuously generate a first clocking signal for a timer for the data transmitter, the first clocking signal having a first clock frequency, wherein the mobile data memory is supplied with electrical energy from the energy store during a cycle inactive idle mode, wherein power consumption during the idle mode comprises a first power consumption magnitude;
    a second oscillator configured to cyclically generate a second clocking signal, the second clocking signal having a second clock frequency higher than the first clock frequency; and
    a control unit responsive to a detector configured to monitor a signal level corresponding to frequencies emitted by the read/write device, the control unit including a comparator configured to compare the signal level relative to a detection threshold so that, when the monitored signal level exceeds the detection threshold, the second oscillator is controlled to generate the second clocking signal during a cyclic polling time of a polling cycle, and if the monitored signal level reverts to a level below the detection threshold, the second oscillator is switched off, wherein the data receiver is coupled to receive during the cyclic polling time the second clocking signal to perform data reception at a data reception rate, wherein the second clock frequency is sufficiently high relative to the data reception rate to oversample the data being received; and
    a data demodulator coupled to receive during the cyclic polling time the second clocking signal to perform data demodulation upon a recognition of valid data, wherein the second oscillator is switched on in advance by a predefined time interval relative to the start of the cyclic polling time and prior to the demodulator performing the demodulation of the received data, wherein power consumption during the cyclic polling time comprises a second power consumption magnitude higher than the first power consumption magnitude, wherein the duration of the cyclic polling time is selected to reduce power consumption and increase an operating life of said at least one depletable energy store, and wherein upon a completion of the data demodulation, or a recognition of invalid data, the control unit is configured to revert the mobile data memory to the cycle inactive idle mode.

8. An identification system having a read/write device, comprising:
   a mobile data memory, comprising;
   an antenna;
   a data receiver and a data transmitter connected to the antenna;
   an energy store for supplying direct current (DC) electrical energy;
   a first oscillator configured to continuously generate a first clocking signal for a timer for the data transmitter, the first clocking signal having a first clock frequency, wherein the mobile data memory is supplied with electrical energy from the energy store during a cycle inactive idle mode, wherein power consumption during the idle mode comprises a first power consumption magnitude;
   a second oscillator configured to cyclically generate a second clocking signal, the second clocking signal having a second clock frequency higher than the first clock frequency;
   a control unit responsive to a detector configured to monitor a signal level corresponding to frequencies emitted by the read/write device, the control unit including a comparator configured to compare the signal level relative to a detection threshold so that, when the monitored signal level exceeds the detection threshold, the second oscillator is controlled to generate the second clocking signal during a cyclic polling time of a polling cycle, and if the monitored signal level reverts to a level below the detection threshold, the second oscillator is switched off, wherein the data receiver is coupled to receive during the cyclic polling time the second clocking signal to perform data reception at a data reception rate, wherein the second clock frequency is sufficiently high relative to the data reception rate to oversample the data being received; and
   a data demodulator coupled to receive during the cyclic polling time the second clocking signal to perform data demodulation upon a recognition of valid data, wherein the second oscillator is switched on in advance by a predefined time interval relative to the start of the cyclic polling time and prior to the demodulator performing the demodulation of the received data, wherein upon completion of the data demodulation, or a recognition of invalid data, wherein power consumption during the cyclic polling time comprises a second power consumption magnitude higher than the first power consumption magnitude, wherein the duration of the cyclic polling time is selected to reduce power consumption and increase an operating life of said at least one depletable energy store, and wherein upon a completion of the data demodulation, or a recognition of invalid data, the control unit is configured to revert the mobile data memory to the cycle inactive idle mode to reduce power consumption.

* * * * *